(12) United States Patent
Topping et al.

(10) Patent No.: US 9,169,000 B2
(45) Date of Patent: Oct. 27, 2015

(54) LEADING EDGE RIB ASSEMBLY

(75) Inventors: Simon Topping, Bristol (GB);
Christopher Payne, Clevedon (GB);
Llifon Williams, Bristol (GB); Martin Mayneord, Bristol (GB); David Belfourd, Bristol (GB); Xavier Hue, Bremen (DE)

(73) Assignees: AIRBUS OPERATIONS LIMITED, Bristol (GB); AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 14/232,247

(22) PCT Filed: Jul. 6, 2012

(86) PCT No.: PCT/GB2012/051581
§ 371 (c)(1),
(2), (4) Date: Apr. 11, 2014

(87) PCT Pub. No.: WO2013/007987
PCT Pub. Date: Jan. 17, 2013

(65) Prior Publication Data
US 2014/0231592 A1    Aug. 21, 2014

(30) Foreign Application Priority Data

Jul. 12, 2011    (GB) .................................. 1111922.9

(51) Int. Cl.
*B64C 13/34* (2006.01)
*B64C 9/02* (2006.01)
*B64C 9/22* (2006.01)

(52) U.S. Cl.
CPC . *B64C 13/34* (2013.01); *B64C 9/22* (2013.01); *B64C 9/02* (2013.01)

(58) Field of Classification Search
CPC .............. B64C 9/22; B64C 9/24; B64C 9/26; B64C 9/28; B64C 9/02; B64C 3/50; B64C 3/187; B64C 13/34
See application file for complete search history.

(56) References Cited

U.S. PATENT DOCUMENTS

| 3,146,973 A | 9/1964 | Ernst-Gunter |
| 3,203,275 A | 8/1965 | Hoover |

(Continued)

FOREIGN PATENT DOCUMENTS

| EP | 0045987 A1 | 2/1982 |
| EP | 1338506 A1 | 8/2003 |
| WO | 9743557 A1 | 11/1997 |

OTHER PUBLICATIONS

International Search Report mailed Jan. 24, 2014 in International Application No. PCT/GB2012/051581, filed Jul. 6, 2012.

(Continued)

*Primary Examiner* — Tien Dinh
*Assistant Examiner* — Richard R Green
(74) *Attorney, Agent, or Firm* — Hauptman Ham, LLP

(57) ABSTRACT

An aircraft wing has a main wing element with a spar and a leading edge rib supported by the spar, a high lift device movably mounted to the main wing element, and an actuation mechanism with a drive shaft and a gear train. The gear train has a drive cog carried by the drive shaft, an actuator cog coupled to the high lift device, and one or more intermediate cogs mounted to the rib and coupled in series with the drive cog and the actuator cog so as to transmit torque from the drive cog to the actuator cog which moves the high lift device between a retracted position and an extended position in which the high lift device increases the camber of the wing. Sizes of the cogs in the gear train are selected so that the drive shaft rotates at a higher rate than the high lift device.

18 Claims, 10 Drawing Sheets

(56) References Cited

U.S. PATENT DOCUMENTS

| | | | |
|---|---|---|---|
| 4,471,928 A | 9/1984 | Cole | |
| 5,222,653 A * | 6/1993 | Joyce et al. | 228/173.6 |
| 7,249,735 B2 * | 7/2007 | Amorosi et al. | 244/214 |
| 2005/0082434 A1 | 4/2005 | Stephan | |
| 2005/0277513 A1 | 12/2005 | Larson | |
| 2007/0102587 A1 | 5/2007 | Jones et al. | |
| 2008/0084130 A1 | 4/2008 | Darby et al. | |
| 2011/0024575 A1 | 2/2011 | Wheaton et al. | |
| 2012/0012712 A1 * | 1/2012 | Eden | 244/201 |

OTHER PUBLICATIONS

Written Opinion mailed Jan. 24, 2014 in International Application No. PCT/GB2012/051581, filed Jul. 6, 2012.

Search Report for Application No. GB1111922.9, dated Oct. 5, 2011.

* cited by examiner

LEADING EDGE RIB ASSEMBLY

RELATED APPLICATIONS

The present application is a National Phase of International Application Number PCT/GB2012/051581, filed Jul. 6, 2012, and claims priority from British Application Number 1111922.9, filed Jul. 12, 2011.

FIELD OF THE INVENTION

The present invention relates to a leading edge rib assembly for an aircraft wing, and an aircraft wing incorporating a high lift device.

BACKGROUND OF THE INVENTION

A conventional aircraft wing comprises a main wing element with a spar; a high lift device (such as a slat or Krueger flap) which is movably mounted to the main wing element; and an actuation mechanism which moves the high lift device between a retracted position and an extended position in which the high lift device increases the camber of the wing. A known mechanisms comprises a drive shaft which runs span-wise along the wing, and an actuator shaft which is positioned forward of the drive shaft and also runs span-wise along the wing. Power is transmitted from the drive shaft to the actuator shaft via two bevel gears, a down-drive shaft between the bevel gears, and a gear box extending in line with the actuator shaft. A problem with such an actuator mechanism is that the gearbox takes up valuable space.

SUMMARY OF THE INVENTION

A first aspect of the invention provides a leading edge rib assembly for an aircraft wing, the assembly comprising a rib; and a gear train comprising two or more cogs which are mounted to the rib and coupled in series so as to transmit torque from a first one of the cogs at a first end of the gear train to a second one of the cogs at a second end of the gear train, the sizes of the cogs in the gear train being selected so that the first cog rotates at a higher rate than the second cog.

A second aspect of the invention provides an aircraft wing comprising a main wing element with a spar and a leading edge rib which is supported by the spar and extends forward of the spar; a high lift device which is movably mounted to the main wing element; and an actuation mechanism comprising a drive shaft and a gear train, the gear train comprising a drive cog which is carried by the drive shaft, an actuator cog which is coupled to the high lift device (for instance by an actuator arm), and one or more intermediate cogs which are mounted to the rib and coupled in series with the drive cog and the actuator cog so as to transmit torque from the drive cog to the actuator cog which moves the high lift device between a retracted position and an extended position in which the high lift device increases the camber of the wing, the sizes of the cogs in the gear train being selected so that the drive shaft rotates at a higher rate than the actuator cog.

By using an existing structural member (the leading edge rib) to support at least part of the gear train, the invention makes it unnecessary to provide additional structure for this purpose, and also provides a system which is particularly compact in the span-wise direction (that is, the direction of the axes of rotation of the cogs in the gear train).

The cogs of the drive train may be positioned adjacent to the rib without being housed within it. However more preferably at least one of the cogs of the drive train is housed within the rib, making the assembly more compact. The rib may only house part of the gear train (for instance the intermediate cog(s)) or it may house all of the cogs of the gear train. Preferably the rib comprises a rib body and a cover plate, and at least one of the cogs is positioned between, and mounted to, the rib body and the cover plate (typically by means of a pair of bearings). The cover plate may be attached to the rib body by removable fasteners. Alternatively some or all of the cogs of the drive train may be provided as a cassette which is inserted into the rib.

The rib may support some or all of the cogs of the gear train. Typically the gear train comprises three or more cogs which are mounted to the rib.

Typically the cogs have axes of rotation which are substantially parallel with each other.

The gear train may comprise three or more cogs with axes of rotation which do not lie on a straight line. This makes it easier for the gear train to be integrated into the rib structure.

Preferably each cog is mounted to the rib by a respective bearing (or pair of bearings) which may be a spherical bearing. Typically each cog is carried on a shaft. Each shaft may be mounted to the rib by a respective bearing (or pair of bearings) so that the shaft can rotate relative to the rib. Alternatively the cogs may be carried on their respective shafts by the bearings so that the cogs can rotate relative to the shafts.

The high lift device is preferably mounted to the main wing element by an actuator arm, and the actuator arm is coupled to the actuator cog so that when the actuator cog rotates, it rotates the actuation arm.

Typically the main wing element further comprises a leading edge skin, and the rib extends forward of the spar from a proximal end to a distal end at which it supports the leading edge skin. The leading edge skin is typically attached to the rib, either by fasteners (such as bolts) or by being bonded to the rib.

The high lift device may comprise a slat which is mounted on the leading edge skin when in its retracted position and moves forward and down as it moves from its retracted position to its extended position. However more preferably the high lift device is a Krueger flap which is stowed on an under side of the main wing element when in its retracted position, and is mounted to the main wing element so that it moves forward and up from the under side of the main wing element when it moves from its retracted position to its extended position.

BRIEF DESCRIPTION OF THE DRAWINGS

Embodiments of the invention will now be described with reference to the accompanying drawings, in which.

DETAILED DESCRIPTION OF EMBODIMENT(S)

Figure 8:
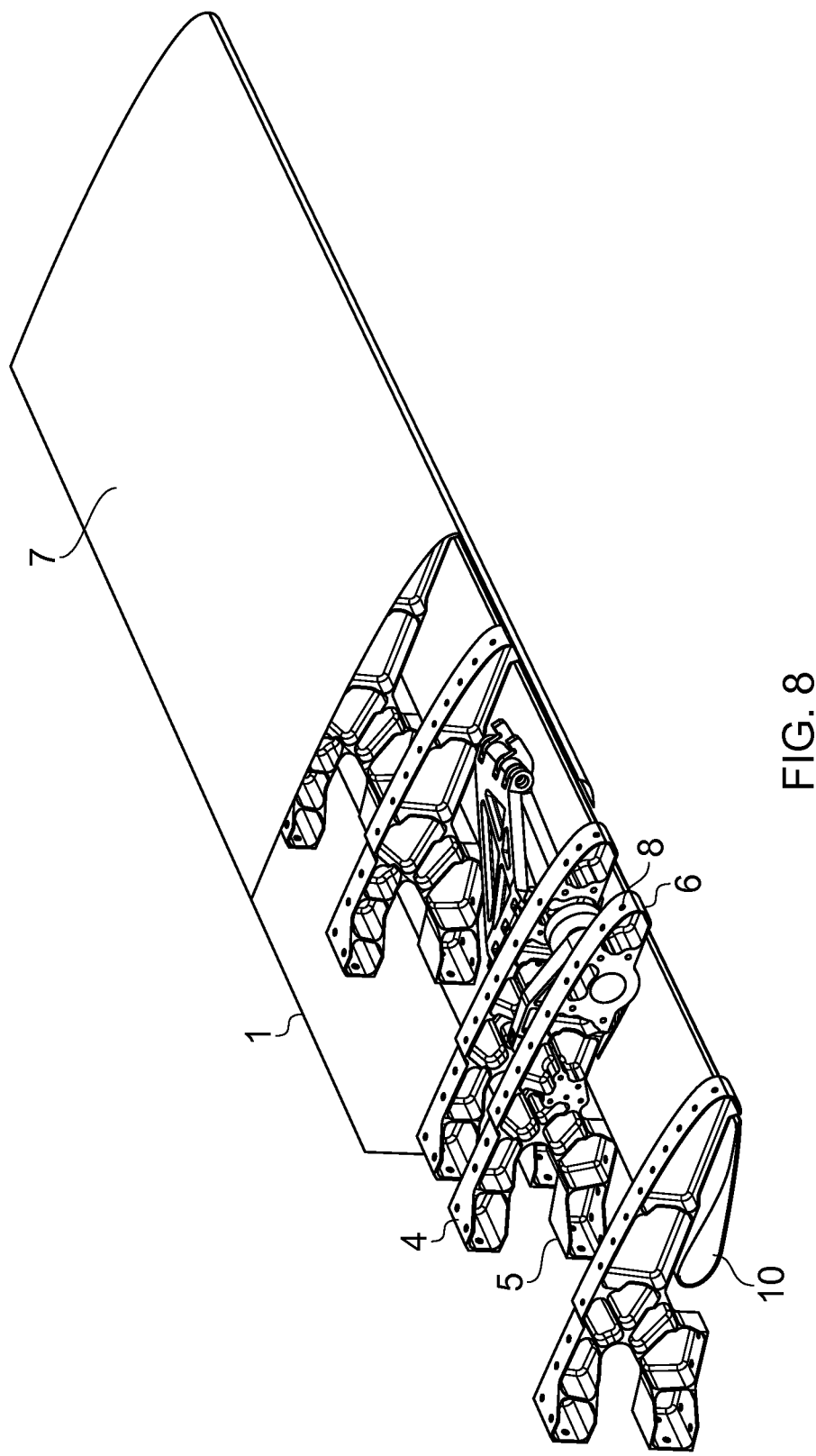
FIG. 8 is a perspective view of the leading edge of an aircraft wing.
Figure 9:
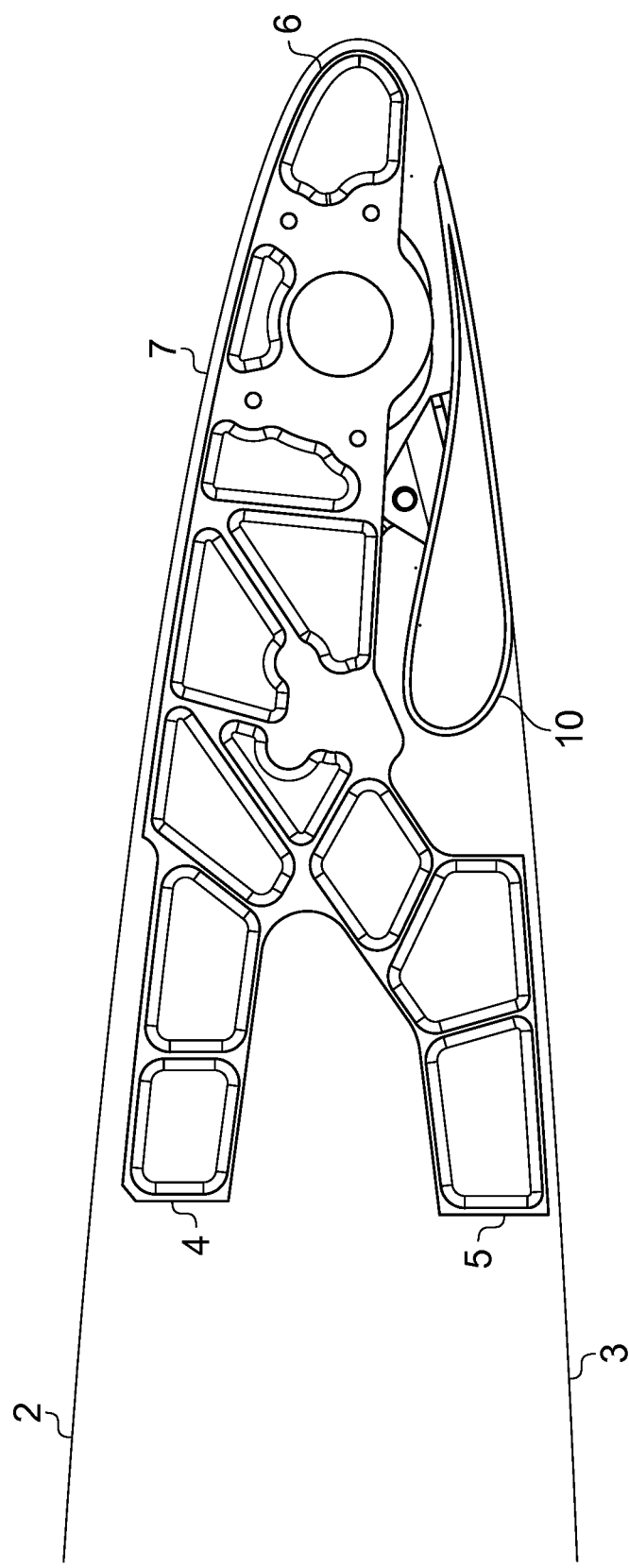
FIG. 9 is a side view showing the flap in its retracted position.
Figure 10:
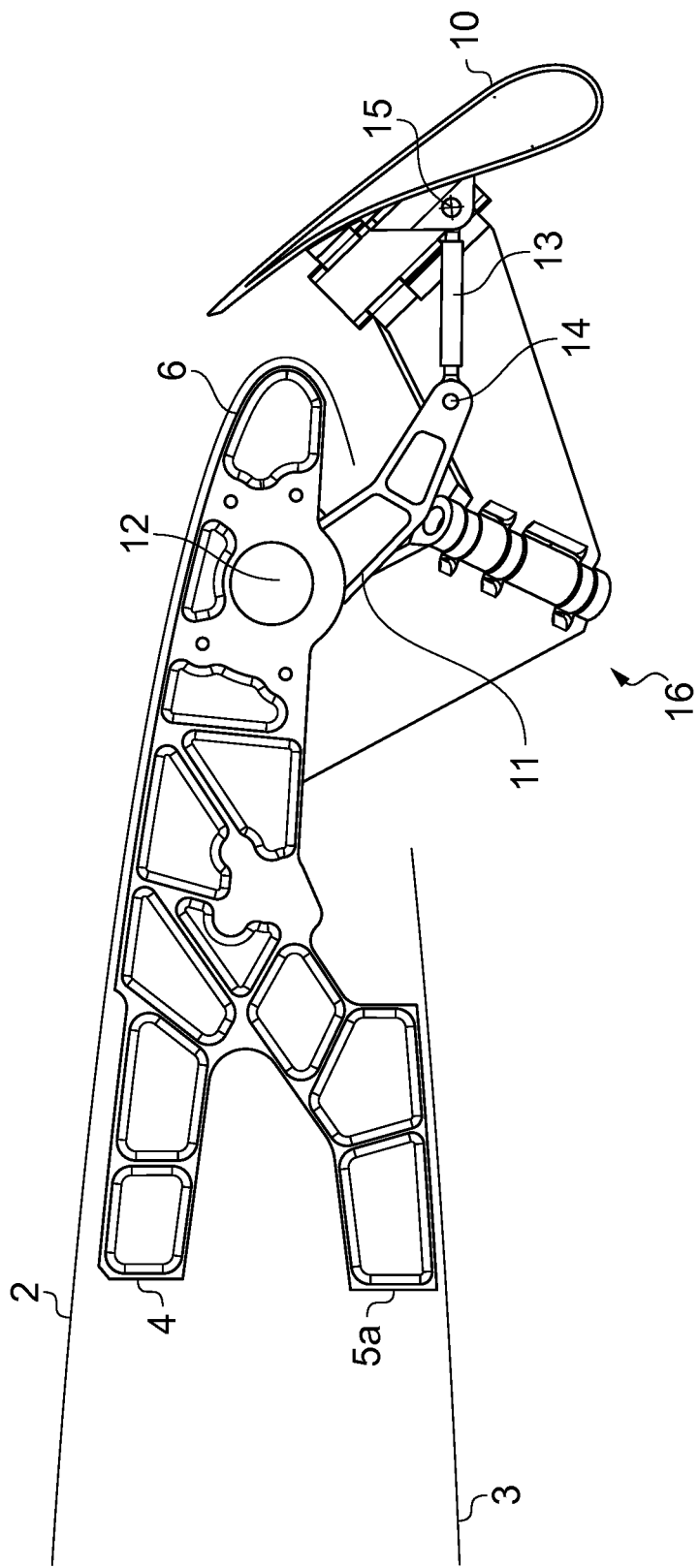
FIG. 10 is a side view showing the flap in its extended position.

FIGS. 8-10 show the leading edge of an aircraft wing. The wing has a main element with a rear spar (not shown), a forward spar 1, and an upper skin 2 and lower skin 3 attached to (and extending between) the spars. The forward spar 1 supports a series of leading edge ribs which extend forward of the spar, one of the leading edge ribs being shown in FIGS. 9 and 10 and five of the leading edge ribs being shown in FIG. 8. Each leading edge rib has a proximal end with a pair of legs 4, 5 which are bolted to the spar 1, and a distal end 6 at which it supports a D-nose leading edge skin panel 7. The panel 7 is bolted to the rib through bolt holes 8 shown in FIG. 8.

Note that FIG. 9 illustrates the upper skin 2 and leading edge skin panel 7 as a single continuous part, but in practice a joint (not shown) is formed between the upper skin 2 and the leading edge skin panel 7.

A Krueger flap 10 is stowed on an under surface of the main wing element so that it lies flush with the lower skin 3 when in its retracted position as shown in FIG. 9. The flap 10 is movably mounted to the main wing element so that it can move forward and upward around the leading edge skin panel 7 from its retracted position on the under surface of the wing (FIG. 9) to an extended position (FIG. 10) in which it increases the camber of the wing.

The flap 10 is mounted to the main wing element by a two-bar link actuation arm. The two-bar link actuation arm comprises a proximal arm 11 pivotally mounted to the rib via an actuation axle 12, and a distal arm 13 which is pivotally mounted to the proximal arm at a pivot 14 and to the flap at a pivot 15. The flap is actuated by rotating the actuation axle 12 which causes the proximal arm 11 to rotate anti-clockwise to the position shown in FIG. 10.

A kinematic hinge 16 also couples the flap to the spar 1. The hinge 16 is a passive element (not connected to the actuation axle 12) which acts as a follower-mechanism so the drive loads for actuating the flap pass through the actuation arm 11, 13 only. The hinge 16 forces the distal arm 13 to rotate about the pivot 14 and the flap 10 to rotate about the pivot 15 as the flap is actuated, thus causing the flap to follow a more complex motion than a simple rotation about the axle 12. The drive mechanism for rotating the axle 12 is omitted in FIGS. 8-10.

Figure 1:
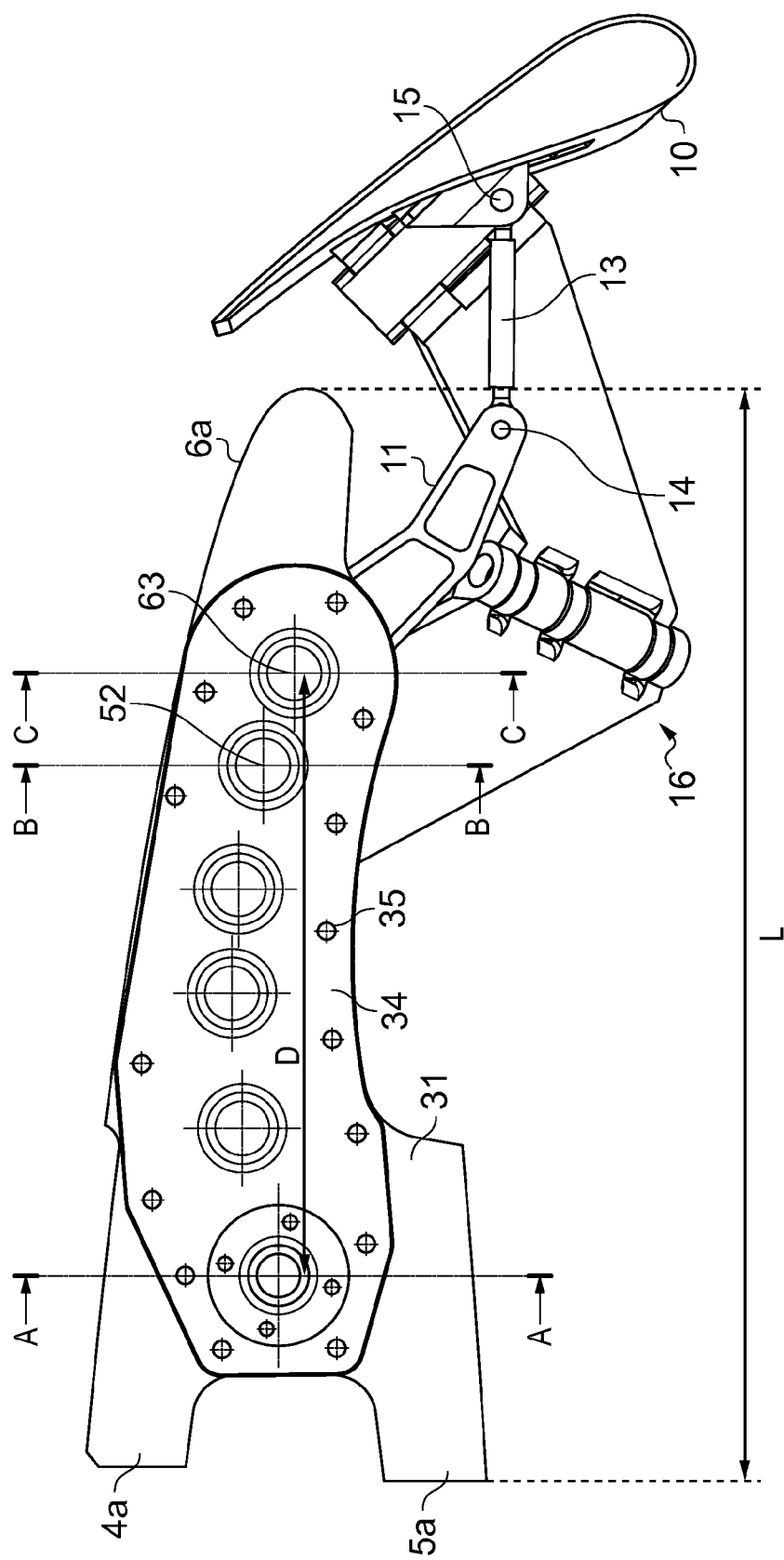
FIG. 1 is a side view of a leading edge rib assembly for an aircraft wing according to an embodiment of the present invention.

FIGS. 1-7 show the leading edge of an aircraft wing according to an embodiment of the present invention. The leading edge 1-7 shown in FIG. 1 is similar in many respects to the leading edge shown in FIGS. 8-10, and the same reference numerals are used to illustrate equivalent parts. However the rib has been redesigned to support a novel drive mechanism for rotating the axle 12.

Figure 3:
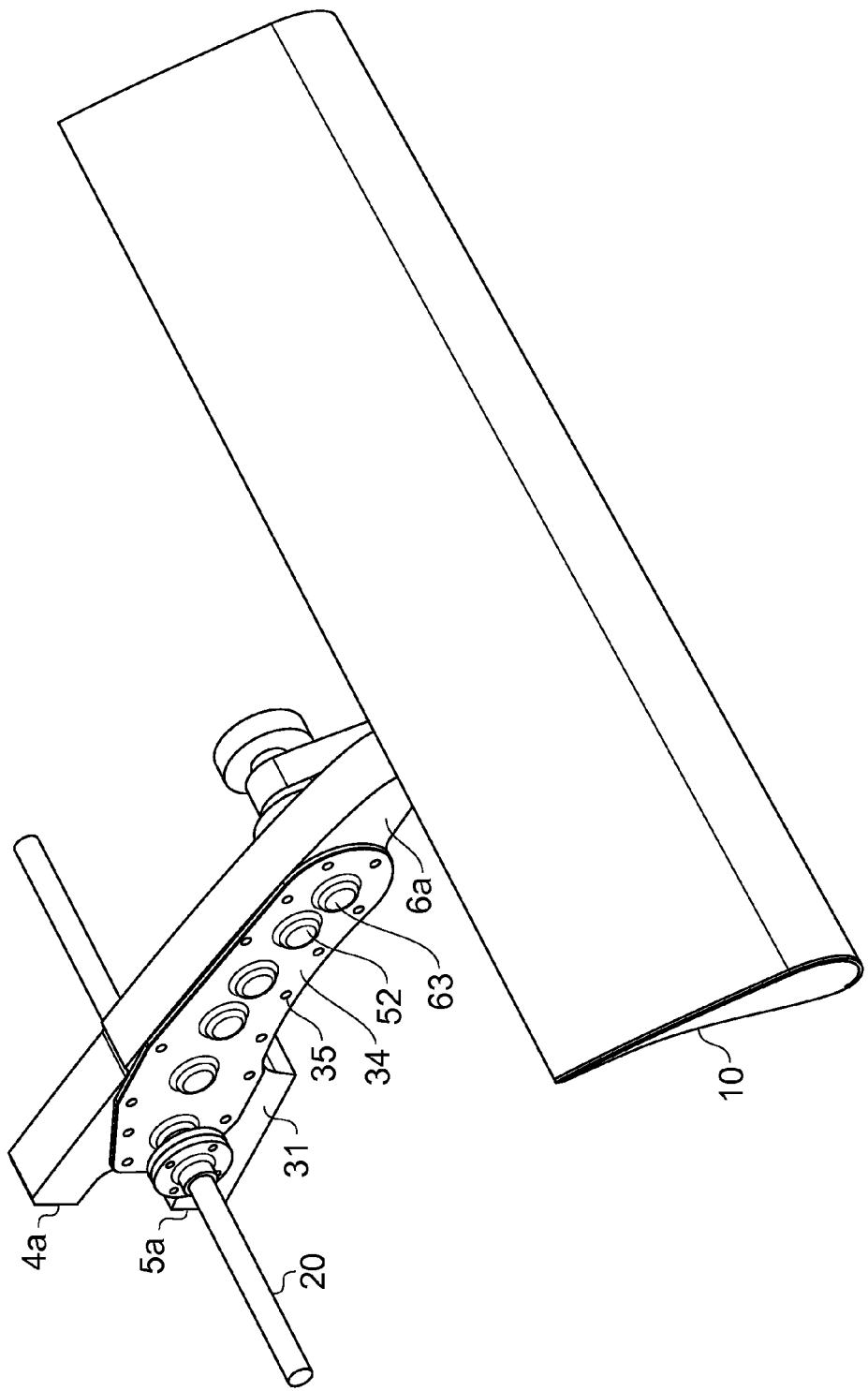
FIG. 3 is a perspective view showing the rib and flap.

The rib shown in FIGS. 1 and 3 has a proximal end with a pair of legs 4a, 5a which are bolted to the spar 1, and a distal end 6a at which it supports the D-nose leading edge skin panel. The leading edge skin panel is not shown in FIG. 1, but is similar to the panel 7 shown in FIG. 10. The leading edge panel is bolted to the distal end 6a of the rib.

Figure 2:
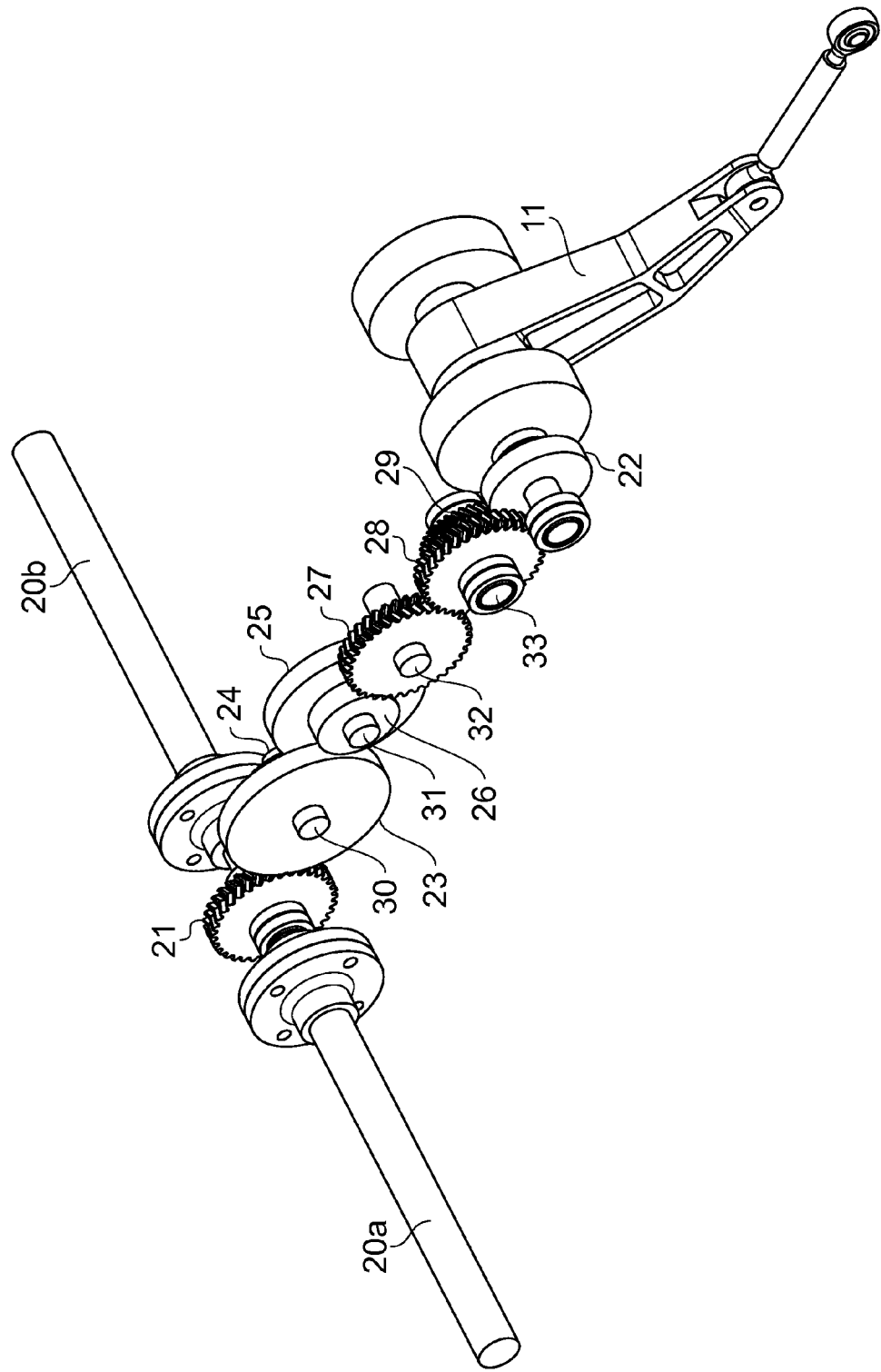
FIG. 2 is a perspective view of a gear train housed within the rib.

The Krueger flap 10 is driven between its retracted and extended positions by an actuation mechanism comprising a drive shaft assembly 20a, 20b (shown in FIG. 2) which runs span-wise along the wing, and a gear train which is housed within the leading edge rib and shown in FIG. 2. The gear train comprises a drive cog 21 positioned towards the proximal end of the rib, an actuator cog 22 positioned towards the distal end 6a of the rib, and seven intermediate cogs 23-29 which are carried on four axles 30-33. The intermediate cogs 23-29 are coupled in series with the drive cog 21 and the actuator cog 22 so as to transmit torque from the drive cog 21 to the actuator cog 22.

The proximal end of the rib has a pair of legs 4a, 5a with a gap between them. This gap is traditionally provided in order to accommodate the drive shaft. Because the drive shaft passes through the rib, this gap between the legs 4a, 5a may be filled with a web if required.

The sizes of the cogs are selected so that the drive cog 21 rotates at a higher rate than the actuator cog 22. Thus:
- the drive cog 21 is smaller than the first intermediate cog 23 with which it meshes;
- the second intermediate cog 24 is smaller than the third intermediate cog 25 with which it meshes;
- the fourth intermediate cog 26 is smaller than the fifth intermediate cog 27 with which it meshes; and
- the seventh intermediate cog 29 is smaller than the actuator cog 22 with which it meshes.

The rib comprises a rib body with a side face 30 (shown in FIGS. 4-6) on one side and a side face 31 on the other side. A recess 32 in the side face 31 houses the gear train. The recess is covered by a cover plate 34 which is attached to the side face 31 of the rib body by fasteners 35 (shown in FIG. 1).

Figure 4:
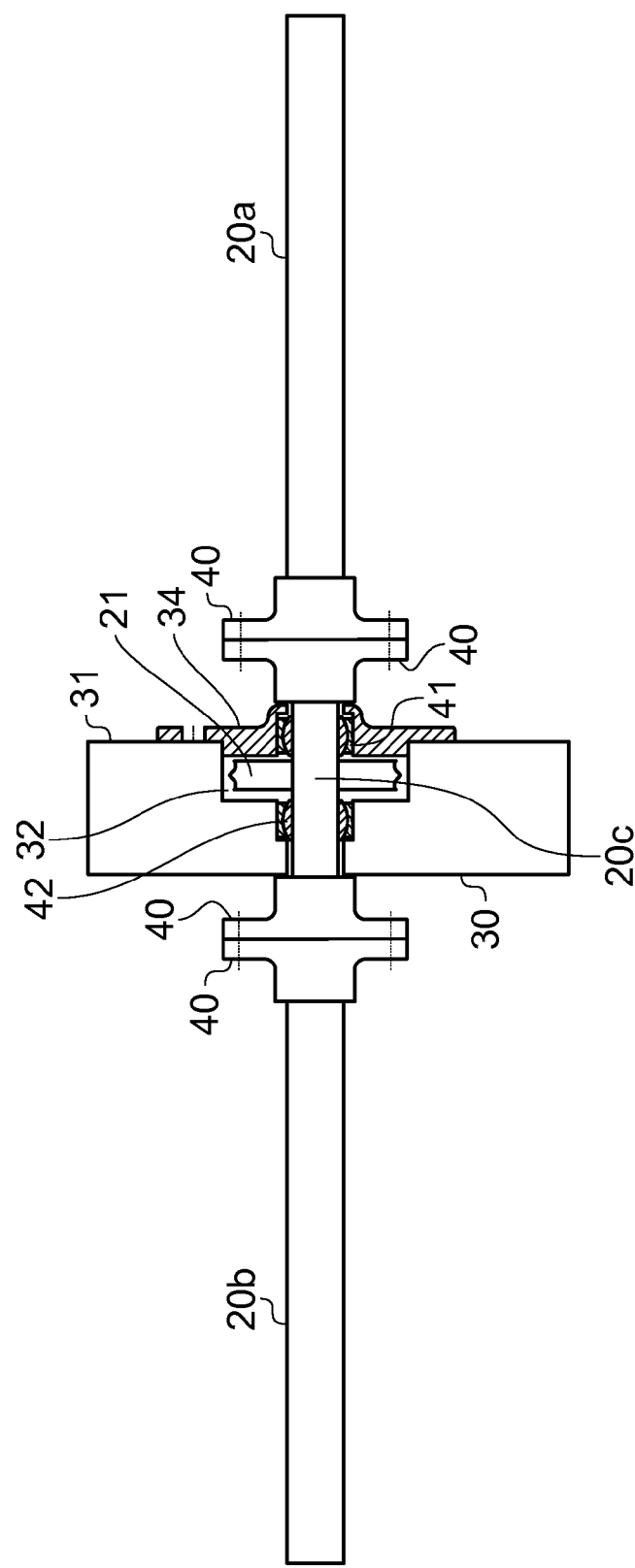
FIG. 4 is a sectional view taken along a line A-A in FIG. 1.

FIG. 4 is a sectional view taken along a line A-A in FIG. 1, showing how the drive cog 21 is mounted to the rib. The drive shaft assembly comprises two drive shaft sections 20a, 20b on either side of the rib, and a drive shaft section 20c inside the rib. Each drive shaft section is terminated in a coupling plate with a flange 40 which is bolted to an adjacent flange 40 to couple together the three drive shaft sections. The drive shaft section 20c is mounted to the cover plate 34 by a spherical bearing 41, and to the rib body by a spherical bearing 42.

Figure 5:
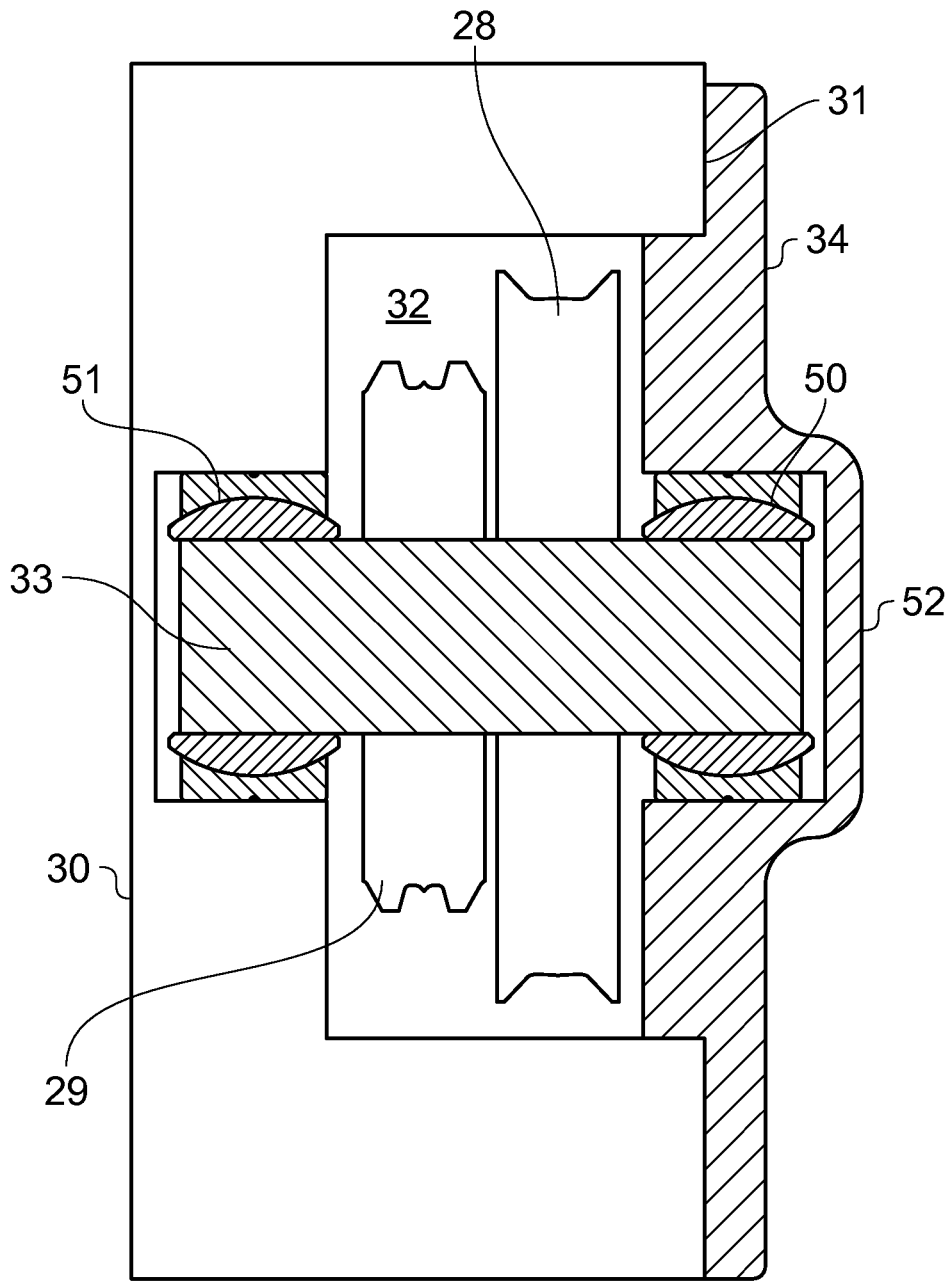
FIG. 5 is a sectional view taken along a line B-B in FIG. 1.

The four axles 30-33 carrying the intermediate cogs are mounted to the rib in a similar fashion. FIG. 5 is a sectional view taken along a line B-B in FIG. 1, showing the axle 33. The axle 33 is mounted to the cover plate 34 by a spherical bearing 50, and to the rib body by a spherical bearing 51. The bearing 50 is housed within a recess in the cover plate 34, and the cover plate has a raised part 52 which can be seen in FIGS. 1 and 3.

Figure 6:
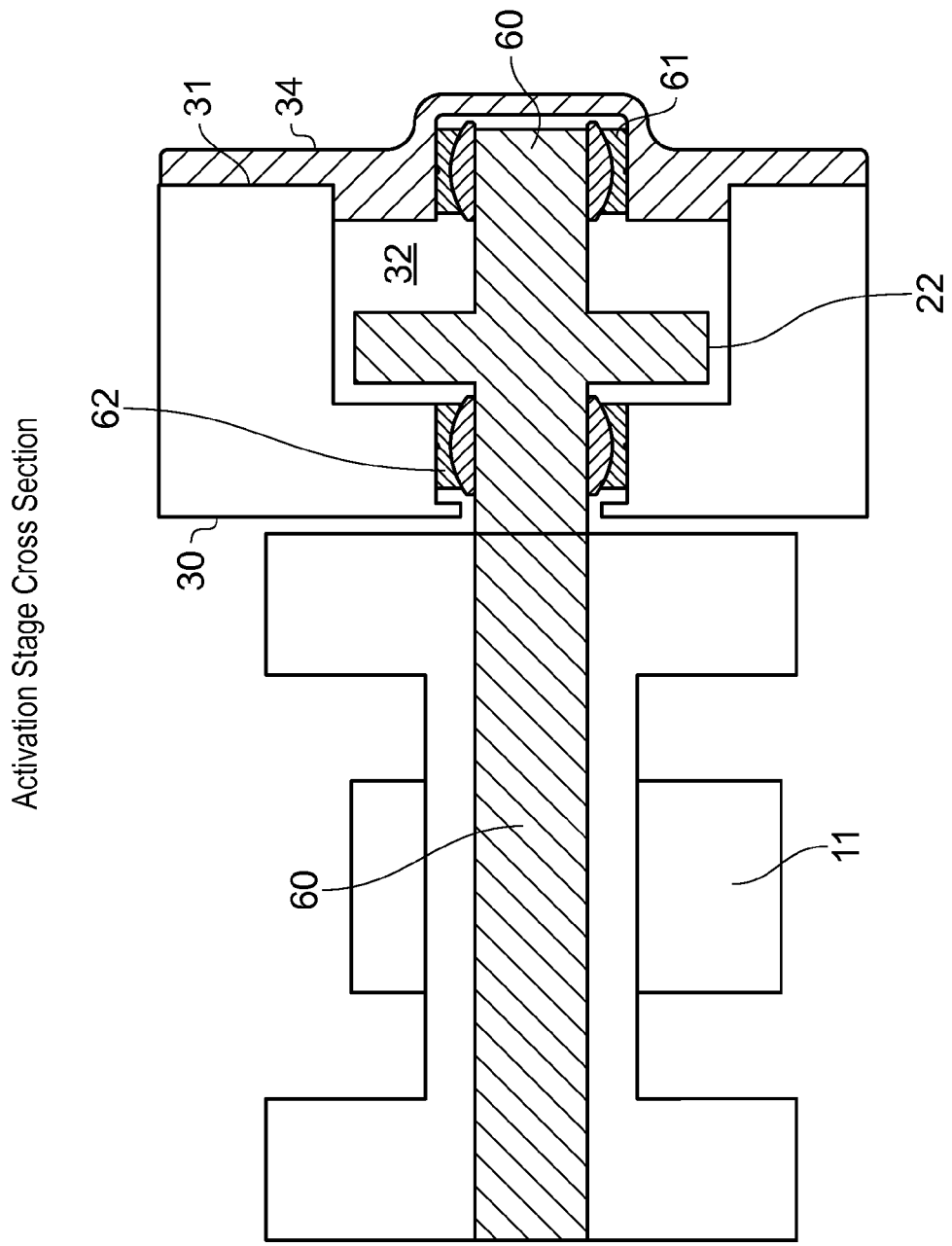
FIG. 6 is a sectional view taken along a line C-C in FIG. 1.

FIG. 6 is a sectional view taken along a line C-C in FIG. 1 showing how the actuator cog 22 is mounted to the rib. The cog 22 is carried on an actuator shaft 60 which is mounted to the cover plate 34 by a spherical bearing 61, and to the rib body by a spherical bearing 62. The bearing 61 is housed within a recess in the cover plate 34, and the cover plate has a raised part 63 which can be seen in FIGS. 1 and 3. The proximal arm 11 of the actuator arm is mounted to the actuator shaft 60 and can be seen in FIGS. 2 and 6.

Figure 7:
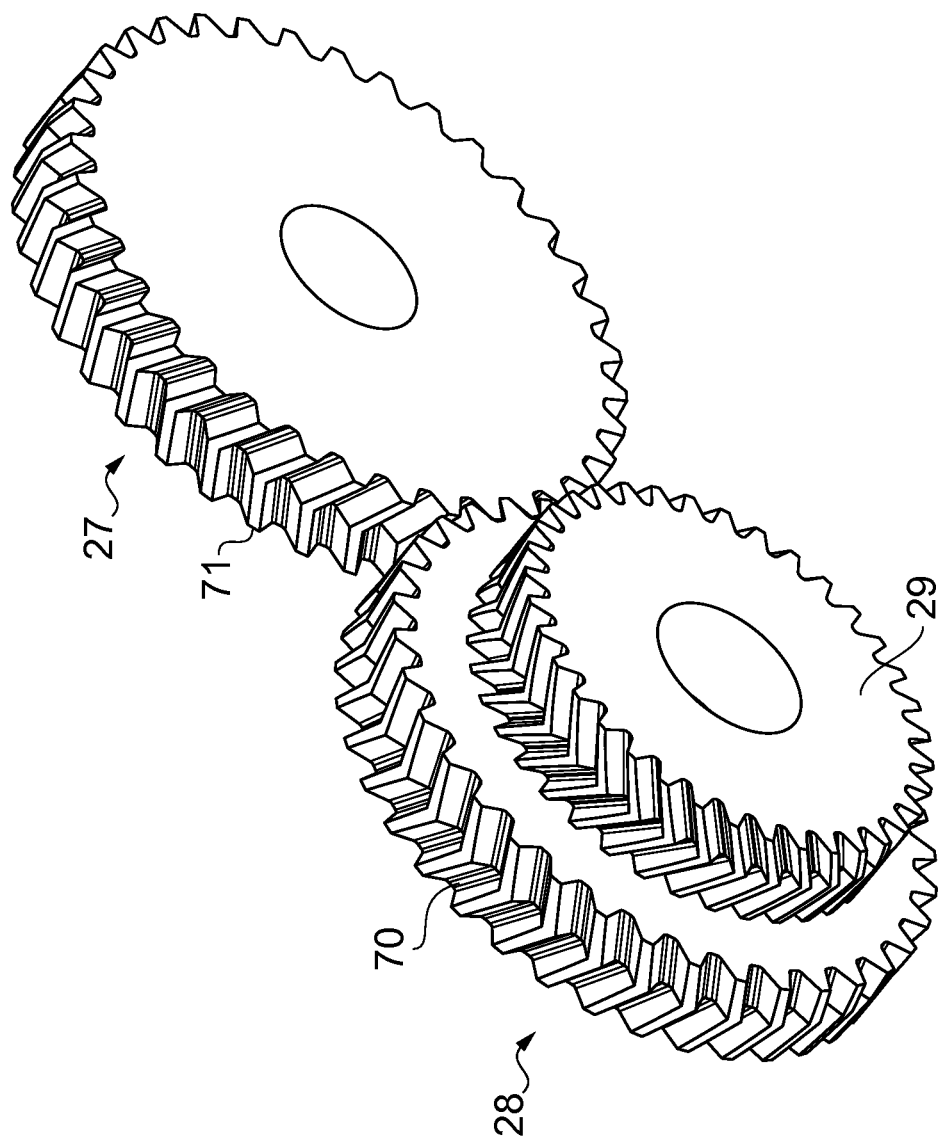
FIG. 7 is a perspective view showing the detailed construction of the teeth of three of the cogs.

FIG. 2 shows the teeth of four of the cogs 21, 27, 28, 29 in detail, the other cogs 23, 24, 25, 26, 22 being shown schematically as circular disks. The detailed construction of the teeth of the cogs 27-29 is shown in FIG. 7. Each cog has V-shaped grooves 70 which mesh with V-shaped teeth 71 in the other cog. This enables the cogs to continue to mesh in the presence of wing bending. The other cogs 21-26 have similar V-shaped teeth and grooves.

As shown in FIG. 1, the drive shaft, the actuator shaft and the axles of the intermediate cogs do not lie on a straight line. The drive shaft, the intermediate cogs and the actuator shaft have axes of rotation which are spaced apart progressively forward and substantially parallel with each other as shown most clearly in FIG. 2.

FIG. 1 also shows that the gear train occupies a majority of the length of the rib, with the drive cog 21 being closer to the front spar than the actuator cog. The drive 21 cog and actuator cog 22 have axes of rotation which are separated by a distance D, the spar and the distal end of the rib are separated by a distance length L, and the ratio D/L is greater than 0.5. This enables the actuation cog 22 to be positioned close to the leading edge of the rib.

Although the invention has been described above with reference to one or more preferred embodiments, it will be appreciated that various changes or modifications may be made without departing from the scope of the invention as defined in the appended claims.

The invention claimed is:

1. A leading edge rib assembly for an aircraft wing, the assembly comprising a rib; and a gear train comprising two or more cogs which are mounted to the rib and coupled in series so as to transmit torque from a first one of the cogs at a first end of the gear train to a second one of the cogs at a second end of the gear train, the sizes of the cogs in the gear train being selected so that the first cog rotates at a higher rate than the second cog, and wherein at least one of the cogs is housed within a recess of the rib.

2. The assembly of claim 1 wherein all of the cogs of the gear train are housed within the rib.

3. The assembly of claim 1 wherein the rib comprises a rib body and a cover plate, and wherein at least one of the cogs is positioned between, and mounted to, the rib body and the cover plate.

4. The assembly of claim 3 wherein the cover plate is attached to the rib body by removable fasteners.

5. The assembly of claim 3 wherein the cover plate is attached to the rib body by removable fasteners.

6. The assembly of claim 5 wherein the three or more cogs have axes of rotation which do not lie on a straight line.

7. The assembly of claim 1 wherein each cog is mounted to the rib by a respective bearing.

8. The assembly of claim 7 wherein each cog is carried on a shaft, and each shaft is mounted to the rib by a respective bearing so that the shaft can rotate relative to the rib.

9. The assembly of claim 1 wherein each cog has V-shaped teeth which mesh with V-shaped grooves in an adjacent one of the cogs.

10. An aircraft wing comprising a main wing element with a spar and a leading edge rib which is supported by the spar and extends forward of the spar; a high lift device which is movably mounted to the main wing element; and an actuation mechanism comprising a drive shaft and a gear train, the gear train comprising a drive cog which is carried by the drive shaft, an actuator cog which is coupled to the high lift device, and one or more intermediate cogs which are mounted to the rib and coupled in series with the drive cog and the actuator cog so as to transmit torque from the drive cog to the actuator cog which moves the high lift device between a retracted position and an extended position in which the high lift device increases the camber of the wing, the sizes of the cogs in the gear train being selected so that the drive shaft rotates at a higher rate than the actuator cog, and wherein at least one of the cogs is housed within a recess of the rib.

11. The wing of claim 10 wherein each intermediate cog is mounted to the rib by a respective bearing.

12. The wing of claim 10 wherein the main wing element further comprises a leading edge skin, and wherein the rib extends forward of the spar from a proximal end to a distal end at which it supports the leading edge skin.

13. The wing of claim 10 wherein the high lift device is mounted to the main wing element by an actuator arm, and wherein the actuator arm is coupled to the actuator cog so that when the actuator cog rotates, it rotates the actuation arm.

14. The wing of claim 10 wherein the drive cog is mounted to the rib.

15. The wing of claim 10 wherein the actuator cog is mounted to the rib.

16. The wing of claim 10 wherein the high lift device is a Krueger flap which is stowed on an under side of the main wing element when in its retracted position, and is mounted to the main wing element so that it moves forward and up from the under side of the main wing element when it moves from its retracted position to its extended position.

17. The wing of claim 10 wherein the drive cog has an axis of rotation which is positioned closer to the spar than the actuator cog.

18. The wing of claim 10 wherein the drive cog has an axis of rotation which is closer to the spar than the actuator cog and the intermediate cog(s); and the (or each) intermediate cog has an axis of rotation which is closer to the spar than the actuator cog.

* * * * *